US012183489B2

(12) United States Patent
Bitto-Golon et al.

(10) Patent No.: US 12,183,489 B2
(45) Date of Patent: Dec. 31, 2024

(54) PROCESS FOR MANUFACTURING A PTC HEATING ELEMENT AND PTC HEATING ELEMENT

(71) Applicant: Eberspächer catem Hermsdorf GmbH & Co. KG, Hermsdorf (DE)

(72) Inventors: Florian Bitto-Golon, Remse (DE); Alfred Blüml, Grünwald (DE); Yves Knüpfer, Caaschwitz (DE); Andreas Kümpel, Wünschensdorf/Elster (DE)

(73) Assignee: Eberspächer catem Hermsdorf GmbH & Co. KG, Hermsdorf (DE)

( * ) Notice: Subject to any disclaimer, the term of this patent is extended or adjusted under 35 U.S.C. 154(b) by 703 days.

(21) Appl. No.: 17/393,015

(22) Filed: Aug. 3, 2021

(65) Prior Publication Data

US 2022/0044850 A1 Feb. 10, 2022

(30) Foreign Application Priority Data

Aug. 4, 2020 (DE) ..................... 10 2020 120 473.6

(51) Int. Cl.

*H01C 7/02* (2006.01)
*H01C 1/01* (2006.01)
*H01C 17/00* (2006.01)
*H05B 3/16* (2006.01)

(52) U.S. Cl.

CPC ................. *H01C 7/02* (2013.01); *H01C 1/01* (2013.01); *H01C 17/00* (2013.01); *H05B 3/16* (2013.01)

(58) Field of Classification Search

CPC ........ H01C 17/00; H01C 17/283; H01C 1/01; H01C 1/144; H05B 3/16; H05B 3/24

See application file for complete search history.

(56) References Cited

U.S. PATENT DOCUMENTS

| | | | | |
|---|---|---|---|---|
| 6,229,124 B1 * | 5/2001 | Trucco | ................ | H05K 3/3494 219/616 |
| 2004/0048414 A1 | 3/2004 | Heinz et al. | | |
| 2015/0296615 A1 * | 10/2015 | Schmalbuch | ............ | H05K 1/09 174/257 |
| 2019/0084374 A1 | 3/2019 | Min et al. | | |

FOREIGN PATENT DOCUMENTS

| | | | | |
|---|---|---|---|---|
| CN | 1937859 A | 3/2007 | | |
| CN | 103228998 A | 7/2013 | | |
| CN | 107073617 A | 8/2017 | | |
| EP | 0026457 A2 | 4/1981 | | |
| WO | WO-2012025111 A2 * | 3/2012 | ........... | B60H 1/2215 |
| WO | 2014096140 A1 | 6/2014 | | |

* cited by examiner

*Primary Examiner* — Thien S Tran

(74) *Attorney, Agent, or Firm* — McGlew and Tuttle, P.C.

(57) ABSTRACT

A process manufactures a PTC heating element (10) that includes at least one PTC component (20) and, on at least one side (50, 52) of the at least one PTC component (20), at least one carrier (14, 16) permanently connected to the PTC component (20). The process includes arranging solder material (46, 48) between the one side of the at least one PTC component (20), which side is to be permanently connected to the at least one carrier (14, 16), and the at least one carrier to be connected on this side of the at least one PTC component (20). The solder material (46, 48) is melted by induction soldering to connect the at least one PTC component (20) to the at least one carrier (14, 16).

20 Claims, 3 Drawing Sheets

PROCESS FOR MANUFACTURING A PTC HEATING ELEMENT AND PTC HEATING ELEMENT

CROSS REFERENCE TO RELATED APPLICATIONS

This application claims the benefit of priority under 35 U.S.C. § 119 of German Application 10 2020 120 473.6, filed Aug. 4, 2020, the entire contents of which are incorporated herein by reference.

TECHNICAL FIELD

The present invention pertains to a process for manufacturing a Positive Temperature Coefficient (PTC) heating element as well as to a PTC heating element manufactured, for example, according to such a process.

TECHNICAL BACKGROUND

PTC heating elements are used in vehicle construction for heating gaseous or liquid media, for example, in order to transfer heat to the air to be introduced into the interior of a vehicle. The use of PTC heating elements is considered, above all, in purely electric motor-operated vehicles, in which other heat sources, for example, an internal combustion engine or a fuel-operated heater, are not available. Such PTC heating elements are also employed in other areas, for example, for heating trains or for heating fuel cells.

SUMMARY

An object of the present invention is to provide a process for manufacturing a PTC heating element as well as a PTC heating element, with which process and PTC heating element an efficient heating process of a PTC heating element is achieved along with the possibility of being able to carry out the manufacturing process in a simple and cost-effective manner.

This object is accomplished by a process for manufacturing a PTC heating element, wherein the PTC heating element comprises at least one PTC component and, on at least one side of the at least one PTC component, a carrier connected permanently to the at least one PTC component, the process comprising the following steps:

a) arrangement of solder material between at least one side of at least one PTC component, which side is to be permanently connected to a carrier, and a carrier to be connected on this side to the at least one PTC component, and
b) melting of the solder material by induction soldering and hence connecting the at least one PTC component to at least one carrier.

The procedure according to the present invention for manufacturing a PTC heating element offers the possibility to introduce the energy necessary for melting the solder material uniformly into a larger surface area or volume area in a connection process that can be carried out with means having a technically comparatively simple configuration in order to uniformly melt the solder material used to establish a permanent mechanical connection as well as to establish an electrically conductive connection to the PTC component. Since no additional means are necessary in addition to this solder material to establish a flat mechanical and electrically conductive connection of a PTC component, the structure is compact and mechanically as well as thermally stable. At the same time, the use of solder material also as a material establishing the mechanical connection ensures good heat dissipation from a PTC component.

The solder material can be applied in step a) to at least one side of the PTC component, which side is to be connected to a carrier. As an alternative or in addition, the solder material can be applied in step a) to at least one carrier to be connected to the at least one PTC component.

In order to make it possible in the process to distribute the solder material uniformly, it is proposed that the solder material is applied in step a) in the free-flowing state, preferably by screen printing. Other procedures for applying free-flowing, for example, pasty material, for example, the application of this material to a surface to be coated and the distribution of the free-flowing material on this surface by means of a doctor blade or of such a tool, may be employed as well.

In an alternative procedure, the solder material may be arranged in step a) by positioning a solder material shaped part between the at least one PTC component and the at least one carrier to be connected thereto. Processes for applying and distributing free-flowing material can thus be avoided. At the same time, the quantity of the solder material used in a defined surface area is defined exactly by the size of such a solder material shaped part.

In order to achieve an especially good adhesiveness and hence increased stability of the mechanical connection, it is further proposed that step a) comprise prior to the arrangement of the solder material the provision of a coating consisting of metallic material on at least one side of the at least one PTC component, which side is to be connected to a carrier, or/and on at least one carrier to be connected to the at least one PTC component.

It is possible in this case to proceed, for example, such that the coating is provided by applying a free-flowing, metal-containing coating material, preferably by screen printing, and by hardening the coating material on at least one side of the at least one PTC component, which side is to be connected to the carrier, or/and on at least one carrier to be connected to the at least one PTC component. Other procedures may be employed to apply the free-flowing coating material here as well.

The coating material may contain, for example, aluminum or/and silver and may be heated at a temperature in the range of 600° C. to 900° C. and thus hardened.

The at least one carrier may have a plate-like (plate shape) configuration for a stable, flat connection.

Depending on the environment in which such a PTC heating element shall be used, for example, at least one carrier to be connected to the at least one PTC component may be configured such that an electrical insulation of the PTC heating element towards the outside can also be achieved at the same time by means of such a carrier manufactured with ceramic material.

Especially if such a carrier shall also be integrated at the same time into the electrical connection of a PTC heating element with a power source, at least one carrier to be connected to the at least one PTC component may be made with a metallic material.

If the at least one PTC component is connected to one or more carriers consisting of an electrically insulating material, for example, ceramic material, at least one contact field may be provided on at least one carrier made of a ceramic material, i.e., an electrically insulating material, in order to make possible an electrical connection to a power source.

In an embodiment that can be prepared in a structurally especially simple manner, provisions may be made in this connection for at least one contact field to be provided by the coating provided on a carrier made of an electrically insulating material, for example, ceramic material. Such a metallic material layer thus has, on the one hand, the function of providing a good mechanical connection between a carrier and a PTC component, and, on the other hand, the metallic material layer offers the possibility of being able to connect an electrical line establishing a connection to a power source.

In another type of configuration, at least one contact field may be provided by a layer of solder material provided on a carrier made of ceramic material.

The object mentioned in the introduction is accomplished, furthermore, by a PTC heating element, comprising at least one PTC component and, on at least one side, preferably on two sides of the at least one PTC component, which sides are oriented such that they face away from one another, a carrier permanently connected to this by solder material. Such a PTC heating element may be manufactured, for example, according to a process according to the present invention.

The present invention will be described below in detail with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
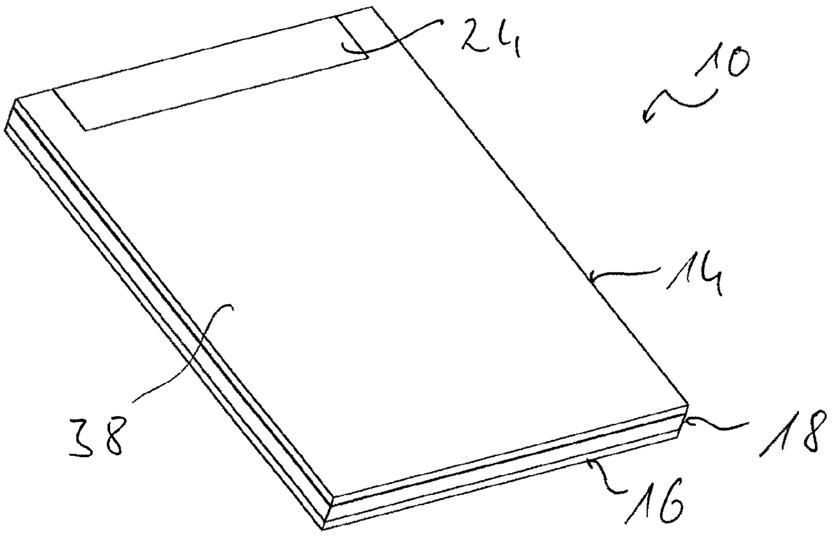
FIG. 1 is a perspective view showing a PTC heating element.
Figure 2:
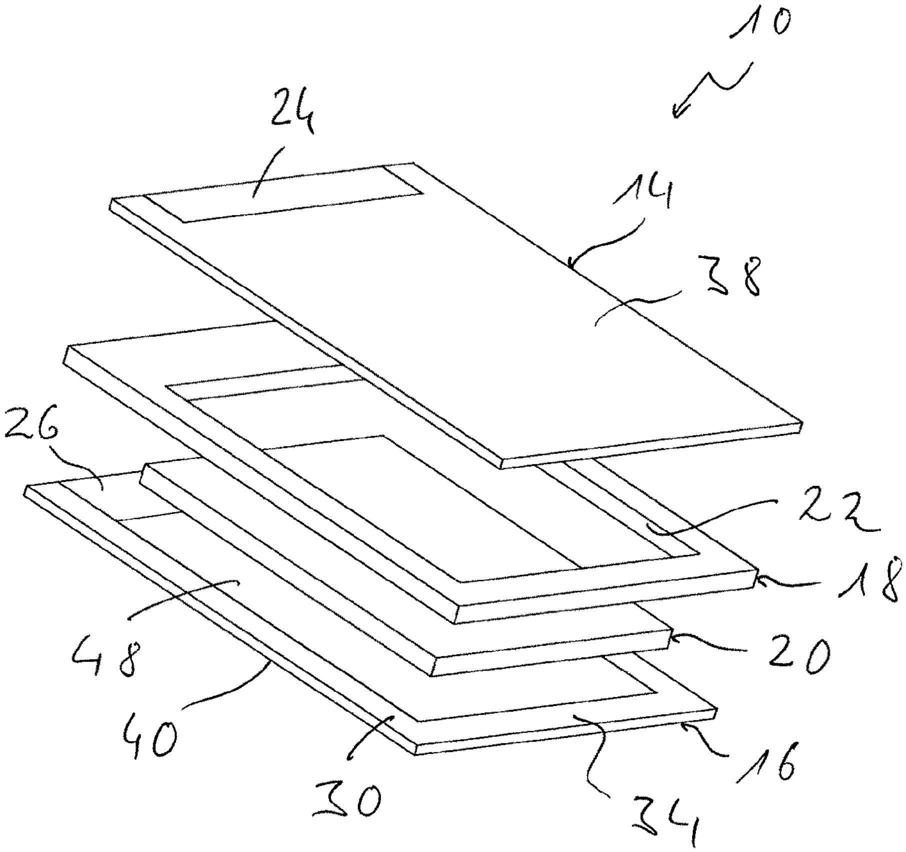
FIG. 2 is an exploded perspective view showing the PTC heating element according to FIG. 1.

Referring to the drawings, FIG. 1 shows in a perspective view a PTC heating element 10, which may be used in different systems to be heated, e.g., electric motor-operated vehicles, trains, fuel cells or the like. The PTC heating element 10, which has an essentially plate-like (plate shape) configuration and which is shown in an exploded view in FIG. 2, is configured with two plate-like carriers 14, 16. The two plate-like carriers 14, 16 are made, for example, of a ceramic material, for example, aluminum oxide, aluminum nitride, silicon nitride, silicon carbide or the like. The PTC component 20, which likewise has, for example, a plate-like shape, is enclosed by a frame 18 made likewise, for example, of a ceramic material, e.g., aluminum oxide, aluminum nitride, silicon nitride, silicon carbide or the like and generates heat during electrical excitation, is arranged between these two plate-like carriers 14, 16. The frame 18 has an opening 22 adapted to the outer circumferential contour and to the external dimension of the PTC component 20 and is preferably shaped and dimensioned in a frame outer circumferential area such that in the assembled state the frame 18 closes essentially flush with the two carriers 14, 16 arranged on both sides thereof, i.e., the frame 18 does not project to the outside nor is the frame 18 set back.

To establish a permanent connection of the PTC component 20, which connection also allows an electrical contacting, with the two carriers 14, 16, a coating 24, 26 consisting of a metal-containing material, i.e., for example, a material containing aluminum or silver, is applied at first to the carriers 14, 16. This may be carried out, for example, by applying the free-flowing, for example, pasty, metal-containing coating material in a screen printing process or in a similar coating process, for example, with the use of a doctor blade or of such a tool. The carriers 14, 16 are coated in the process with this metal-containing coating material on their sides 28, 30 facing the PTC component 20. The carriers 14, 16 are coated in the process on the sides 28, 30, which are to be positioned such that they face the PTC component 20 and are thus to be connected to same, such that a PTC component connection surface area V, which can be seen in connection with the carrier 14 in FIG. 3, will be coated with the coating material, while a respective edge area 32, 34 enclosing the PTC component connection surface area V remains free to the greatest extent possible.

Figure 3:
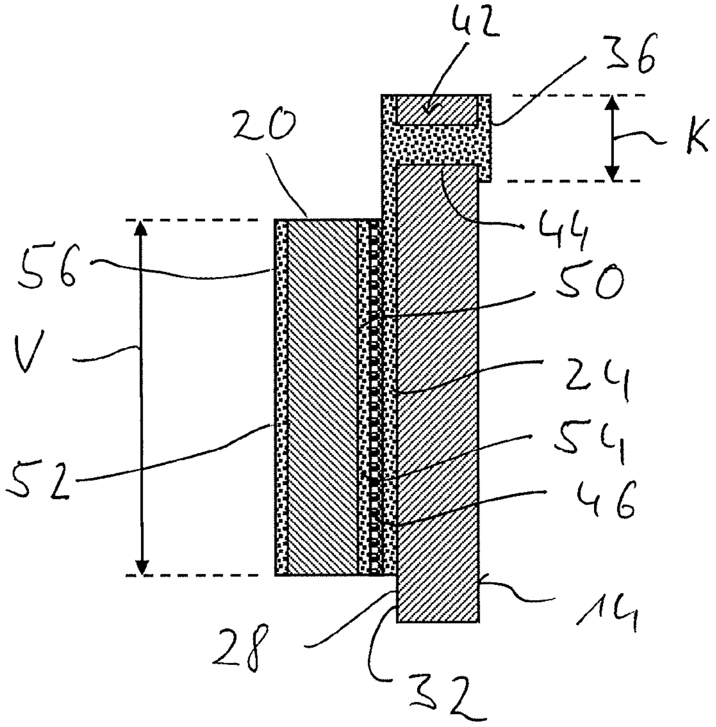
FIG. 3 is a longitudinal sectional view of a PTC component to be connected to a carrier by solder material.

To form a contact field 36, which can be seen in FIG. 3 in connection with the carrier 14, the carriers 14, 16 are likewise coated on their respective sides 38, 40 facing away from the PTC component 20 in a contact field surface area K, which can likewise be seen in connection with FIG. 3 with the coating 24, 26 consisting of a metal-containing material. The areas of the respective coating 24, 26, which are formed on the two sides 28, 38 and 34, 40 of the carriers 14, 16, are connected to one another in the exemplary embodiment shown in FIG. 3 by a connection area 42 in one or more openings 44 formed in the respective carrier 14, 16.

After the metal-containing coating material intended for forming the coatings 24, 26 has been applied to the carriers 14, 16, each of the carriers 14, 16 is heated, so that these coatings 24, 26 are hardened and form a permanent bond with the carriers 14, 16. Depending on the metal-containing material intended for the coatings 24, 26, this may be carried out at a temperature of, for example, up to 800° C.

After the application and hardening of the coatings 24, 26, solder material 46, 48 is applied to these, preferably limited to the PTC component connection surface area V. The solder material 46, 48 may also be applied as a free-flowing, pasty material in a screen printing process or in another coating process. In an alternative embodiment, the solder material 46, 48 may be positioned as a PTC shaped part between a respective carrier 14, 16 or the coating 24, 26 provided thereon in the PTC component connection surface area V and the PTC component 20, so that a layered structure of the two carriers 14, 16 is obtained with the PTC component 20 arranged between them and also with the frame 18 positioned between the two carriers 14, 16, which frame is connected permanently, after the application of the coatings 24, 26, to one of the carriers 14, 16, for example, in the edge area 32, 34 not coated with the respective coating 24, 26, for example, by connection in substance, for example, by bonding. In order to obtain in the process a layering leading to a full-surface and stable connection contact, the frame 18 is configured with a thickness, measured between the two carriers 14, 16, which is at least not greater than the thickness of the material of the PTC component 20 and is preferably smaller than the thickness of this material.

An induction soldering process is then carried out on this layered structure in an induction soldering device, so that the solder material 46, 48 melts flatly and it generates after the cooling a permanent mechanical and electrically conductive connection of the PTC component 20 on both of its sides facing a respective carrier 14, 16 with the respective carrier 14, 16 or the respective coating 24, 26 provided thereon.

In order to make this bond even more stable, a respective coating 54, 56 consisting of a metal-containing material may likewise be provided on the PTC component 20 also made, in general, of a ceramic material on the sides 50, 52 thereof facing the carriers 14, 16 in the manner described above in connection with the carriers 14, 16, so that the solder material 46, 48 produces a connection between the coatings 24, 54, on the one hand, and the coatings 26, 56, on the other hand.

Figure 4A:
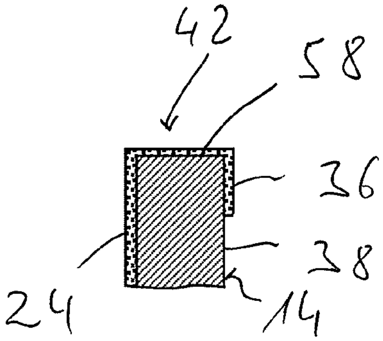
FIG. 4*a* is a partial sectional view showing an alternative contact field configuration.
Figure 4B:
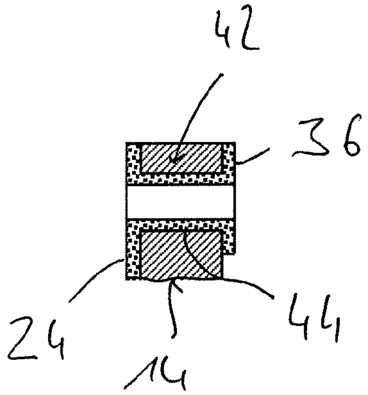
FIG. 4*b* is a partial sectional view showing another alternative contact field configuration.

FIGS. 4*a* and 4*b* show alternative embodiments for coatings 24, 26 provided on the carriers 14, 16 for providing the respective contact fields to be provided thereon in connection with the carrier 14 and the contact field 36 provided thereon. FIG. 4*a* shows the provision of the coating 24 such that this is pulled away around an end face 58 of the carrier 14, so that the coating 24 provided on the carrier 14 extends around the carrier 14 in the area of the end face 58 thereof in a U-shaped manner to provide the contact field 36 in the contact field surface area L. FIG. 4*b* shows a structure corresponding to the configuration shown in FIG. 3, in which the material providing the connection area 42 is provided in the opening or openings 44, but it only wets the surface thereof and does not consequently fill these completely.

Each of the two carriers 14, 16 may be configured such as is shown in FIGS. 3 and 4 for providing a respective connection area 42, and the two carriers 14, 16 preferably have an identical configuration concerning the embodiment of the connection areas 42. The connection areas 42 of the two carriers 14, 16 could, in principle, have mutually different configurations.

Further alternative embodiments will be described with reference to FIGS. 5 and 6. Thus, FIG. 5 shows again in connection with the carrier 14 an embodiment in which a coating consisting of a metallic or metal-containing material is not provided either on the carrier 14 or on the PTC component 20 prior to the application of the solder material 46. In the embodiment shown, the solder material 46 is applied directly to the carrier 14 in the PTC component connection surface area V and on an edge side area to prepare the contact field 36 provided in this embodiment directly by the solder material 46 as well as also the connection area 42 and it is melted during the performance of the induction soldering process and is subsequently cooled.

Figure 6:
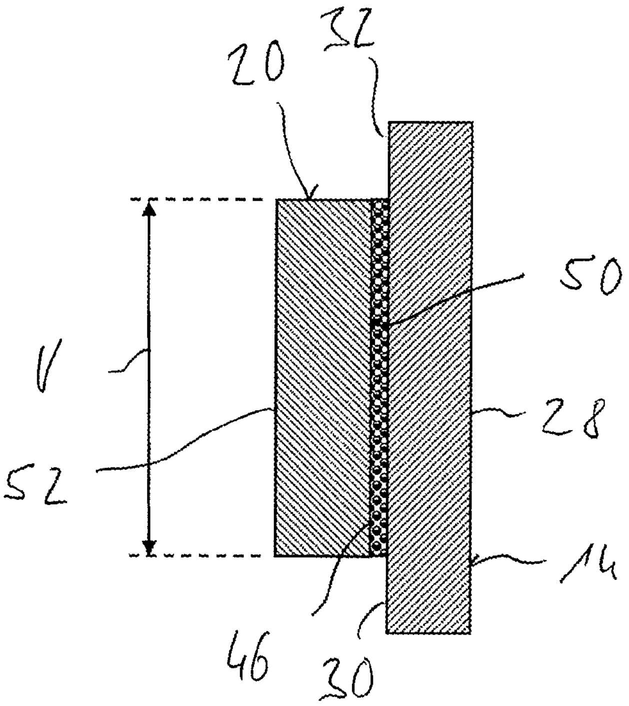
FIG. 6 is a longitudinal sectional view of a PTC component to be connected to a carrier by solder material.

In the embodiment shown in FIG. 6, which may be provided especially when the carrier or the carriers 14, 16 themselves are made of electrically conductive material, i.e., for example, metallic material, for example, aluminum, steel, copper or the like, a coating consisting of a metallic or metal-containing material is not applied either to the carrier 14 or to the PTC component 20. The solder material 46 is provided between the carrier 14 and the PTC component 46 on the side 28 of the carrier 14 facing the PTC component 20 essentially only in the PTC component connection surface area V. The electrical contacting may be brought about on the carrier 14 made of metallic material on any desired area. The above-described use of a solder material shaped part is suitable for providing the solder material 46 especially for this embodiment.

Figure 5:
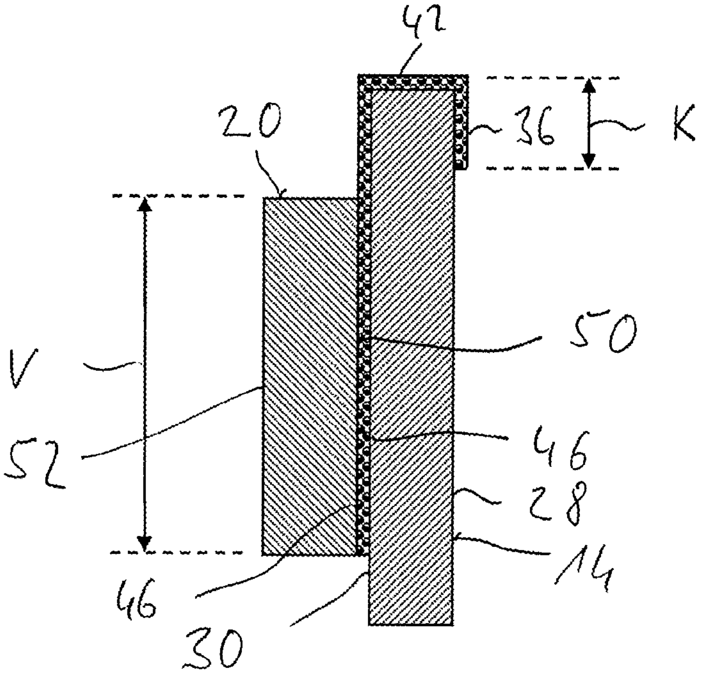
FIG. 5 is a longitudinal sectional view of a PTC component to be connected to a carrier by solder material.

It should also be noted with reference to FIGS. 5 and 6 that a corresponding configuration may, of course, also be provided in connection with the carrier 16 shown in these figures.

In another alternative configuration, a coating 54, 56 consisting of metallic or metal-containing material could be provided, for example, only on the PTC component 20 on one or both sides 50, 52 thereof facing a respective carrier 14 and 16, respectively, whereas no such coating is provided on the respective associated carrier 14 and 16. The solder material 46 and 48, respectively, can then be provided in the above-described manner on the respective carrier 14 and 16 or on the coating 54, 56, or the solder material 46 and 48 may be positioned as a solder material shaped part between a respective carrier 14, 16 and the PTC component 20.

The above-described process for manufacturing the PTC heating element leads in a process that can be carried out in a simple manner to a simply structured configuration of the PTC heating element, in which only a comparatively thin layer of solder material and optionally of an underlying coating consisting of a metallic or metal-containing material is to be provided for establishing the mechanical connection and the electrically conductive connection between the PTC component and the two carriers to be provided on this. The total thickness of the material layers establishing the connection is comparatively thin, which leads, also supported by the circumstance that these material layers are very good heat conductors, to a good dissipation of heat from the PTC heating element. The carriers, preferably made of ceramic material or metallic material, are also good heat conductors contributing to a high efficiency.

Another essential advantage of the PTC heating element 10 manufactured according to the procedure according to the present invention is that, as this is shown in FIG. 3, the PTC component is positioned in relation to the two carriers 14, 16 such that the PTC component connection surface area V does not overlap with the respective contact field surface area K. This means that the PTC component 20 in the PTC heating element 10 also does not overlap with the contact fields and is preferably arranged at a spaced location therefrom. This offers the possibility of using the entire area of the carriers 14, 16, which area is available in connection with the PTC component 20, for transmitting heat to a medium to be heated. This avoids, on the one hand, the development of a heat build-up in the interior of the sandwich-like structure, and, on the other hand, it leads to a high efficiency of a PTC heating element manufactured in this manner, because a dissipation of heat into areas that are not actually used to heat a medium to be heated is ruled out to the greatest extent possible.

It should be noted that different variations are also possible in the above-described procedure for manufacturing a PTC heating element. Thus, it is possible, for example, that a plurality of PTC components are arranged between two carriers with the above-described procedure. For example, the frame may have for this purpose, in association with each PTC component to be provided between the two carriers, an opening receiving this PTC component. Further, it would be possible to make provisions for the two contact fields to be provided for establishing an electrical contacting of the PTC component to be provided on one of the two carriers, whereas no such contact field is present on the other carrier. For example, the two contact fields could be provided on the short sides of one of the two carriers configured with a rectangular circumferential contour, which said short sides are located at spaced locations from one another. In order to in this case avoid an electrical short circuit through the solder material providing such contact fields on one of the two carriers, this solder material may have an interruption in a length area between the two contact fields in the PTC component connection surface area, so that a flow of current is forced through the PTC component. The two carriers are preferably made in this embodiment with electrically insulating material, for example, ceramic material, in order to also avoid an electrical short circuit via the carriers.

While specific embodiments of the invention have been shown and described in detail to illustrate the application of the principles of the invention, it will be understood that the invention may be embodied otherwise without departing from such principles.

What is claimed is:

1. A process for manufacturing a PTC heating element, wherein the PTC heating element comprises at least one PTC component and, on at least one side of the at least one PTC component, a carrier made of an electrically insulating material and permanently connected to the at least one PTC component, the process comprising the steps of:

arranging solder material between the at least one side of the at least one PTC component, which side is to be permanently connected to the carrier, and the carrier to be connected to the least one side of the at least one PTC component; and melting the solder material by induction soldering and thereby connecting the at least one PTC component to the carrier;

wherein the method, prior to the step of arranging the solder material, comprises the steps of:

providing a coating formed of metallic material on a side of the carrier to be connected to the at least one PTC component;

providing at least one contact field on a side of at least one carrier to be positioned facing away from the at least one PTC component by additionally providing the coating formed of metallic material on the side of the at least one carrier to be positioned facing away from the at least one PTC component; and providing a connection of an area of the coating provided on the side of the at least one carrier to be connected to the at least one PTC component and an area of the coating provided on the side of the at least one carrier to be positioned facing away from the at least one PTC component by a connecting area of the coating.

2. The process in accordance with claim 1, wherein:

the step of arranging solder material comprises applying solder material to the at least one side of the at least one PTC component, which side is to be connected to the carrier; or the step of arranging solder material comprises applying solder material to the carrier to be connected to the at least one PTC component; or the step of arranging solder material comprises applying solder material to the at least one side of the at least one PTC component, which side is to be connected to the carrier and also applying solder material to the carrier to be connected to the at least one PTC component.

3. The process in accordance with claim 2, wherein applying solder material comprises applying solder material in a free-flowing state.

4. The process in accordance with claim 1, wherein the step of arranging solder material comprises positioning a solder material shaped part between the at least one PTC component and the carrier to be connected thereto.

5. The process in accordance with claim 1, wherein prior to the step of arranging the solder material, a coating formed of metallic material is provided on the at least one side of the at least one PTC component, which side is to be connected to the carrier.

6. The process in accordance with claim 5, wherein the coating is provided by applying a coating material containing a free-flowing metal and hardening the coating material on the at least one side of the at least one PTC component, which side is to be connected to the carrier.

7. The process in accordance with claim 6, wherein the coating material contains aluminum or/and silver.

8. The process in accordance with claim 6, wherein the coating material is heated at a temperature in a range of 600° C. to 900° C. and is hardened in the process of heating.

9. The process in accordance with claim 1, wherein the carrier to be connected to the at least one PTC component has a plate shape configuration.

10. The process in accordance with claim 1, wherein the coating is provided by applying a coating material containing a free-flowing metal and hardening the coating material on the carrier to be connected to the at least one PTC component.

11. The process in accordance with claim 10, wherein the coating material contains aluminum or/and silver.

12. The process in accordance with claim 10, wherein the coating material is heated at a temperature in a range of 600° C. to 900° C. and is hardened in the process of heating.

13. The process in accordance with claim 1, wherein the connecting area of the coating is provided in at least one opening formed in the at least one carrier.

14. The process in accordance with claim 13, wherein the connecting area of the coating wets an opening surface of the at least one opening and does not fill the at least one opening completely.

15. The process in accordance with claim 1, wherein the connecting area of the coating extends around the at least one carrier in an area of an end face thereof, so that the area of the coating provided on the side of the at least one carrier to be connected to the at least one PTC component, the area of the coating provided on the side of the at least one carrier to be positioned facing away from the at least one PTC component, and the connecting area of the coating extend around the at least one carrier in the area of the end face thereof in a U-shaped manner.

16. A process for manufacturing a PTC heating element, wherein the PTC heating element comprises at least one PTC component and, on at least one side of the at least one PTC component, a carrier made of an electrically insulating material and permanently connected to the at least one PTC component, the process comprising the steps of:

providing a coating formed of metallic material on a side of the carrier to be connected to the at least one PTC component;

providing at least one contact field on a side of at least one carrier to be positioned facing away from the at least one PTC component by additionally providing the coating formed of metallic material on the side of the at least one carrier to be positioned facing away from the at least one PTC component;

providing a connection of an area of the coating provided on the side of the at least one carrier to be connected to the at least one PTC component and an area of the coating provided on the side of the at least one carrier to be positioned facing away from the at least one PTC component by a connecting area of the coating;

arranging solder material between the at least one side of the at least one PTC component, which side is to be permanently connected to the carrier, and the carrier to be connected to the least one side of the at least one PTC component after providing the coating formed of metallic material and after providing the at least one contact field and after providing the connection of the area of the coating provided on the side of the at least one carrier to be connected to the at least one PTC component and the area of the coating provided on the side of the at least one carrier to be positioned facing away from the at least one PTC component; and melting the solder material by induction soldering and thereby connecting the at least one PTC component to the carrier.

17. The process in accordance with claim 16, wherein the coating is provided by applying a coating material containing a free-flowing metal and hardening the coating material on the carrier to be connected to the at least one PTC component.

18. The process in accordance with claim 17, wherein the coating material contains aluminum or/and silver.

19. The process in accordance with claim 17, wherein the coating material is heated at a temperature in a range of 600° C. to 900° C. and is hardened in the process of heating.

20. The process in accordance with claim 17, wherein the connecting area of the coating is provided in at least one opening formed in the at least one carrier.

* * * * *